(12) United States Patent
Haszler et al.

(10) Patent No.: US 6,848,233 B1
(45) Date of Patent: Feb. 1, 2005

(54) COMPOSITE ALUMINIUM PANEL (75) Inventors: Alfred Johann Peter Haszler, Vallendar (DE); Desikan Sampath, Beverwijk (NL); Klaus Alfons Mechsner, Niewied (DE)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/830,448

(22) PCT Filed: Oct. 29, 1999

(86) PCT No.: PCT/EP99/08316

§ 371 (c)(1),
(2), (4) Date: Jul. 30, 2001

(87) PCT Pub. No.: WO00/26020

PCT Pub. Date: May 11, 2000

(30) Foreign Application Priority Data

Oct. 30, 1998 (EP) ............................................. 98203665
Jun. 4, 1999 (EP) ............................................. 99201767

(51) Int. Cl.[7] .............................. E04C 2/32; B32B 3/12; C22C 21/06
(52) U.S. Cl. ................................ 52/783.17; 52/783.11; 420/553; 420/541; 420/543; 148/440; 428/593; 428/603
(58) Field of Search ............................... 420/553, 541, 420/543, 545; 148/415, 440; 428/603, 593; 52/783.11–783.19

(56) References Cited

U.S. PATENT DOCUMENTS

| | | | |
|---|---|---|---|
| 3,667,185 A | * | 6/1972 | Maurer ......................... 52/537 |
| 3,685,229 A | * | 8/1972 | Sale et al. ..................... 52/367 |
| 4,916,027 A | | 4/1990 | DelMundo |
| 5,496,426 A | * | 3/1996 | Murtha ....................... 148/417 |
| 5,534,354 A | | 7/1996 | Gregg et al. |
| 5,821,506 A | | 10/1998 | Matsen |
| 5,908,518 A | | 6/1999 | Hoffmann et al. |

FOREIGN PATENT DOCUMENTS

| | | |
|---|---|---|
| EP | 0432308 | 6/1991 |
| EP | 0557597 | 9/1993 |
| EP | 0799900 | 10/1997 |
| EP | 0823489 | 2/1998 |
| GB | 2182703 | 5/1987 |

OTHER PUBLICATIONS

"ASM Specialty Handbook: Aluminum and Aluminum Alloys", ASM International, 1993, pp 390–393.*
"Metals Handbook: Desk Edition", 2nd ed., ASM International, 1998, pp 445, 450.*
American Society for Metals: "Metals Handbook, 9th Ed, vol. 14", Forming and Forging US, Metals Park, ASM, VOL. vol. 14, Page(s) 624–635–635 XP002097173.
J E Hatch: "Aluminium—Properties and Physical Metallurgy", US, OHIO, American Society for Metals, Page(s) 372–374 XP002097155.

* cited by examiner

Primary Examiner—George Wyszomierski
Assistant Examiner—Janelle Combs Morillo
(74) Attorney, Agent, or Firm—Stevens, Davis, Miller & Mosher, LLP

(57) ABSTRACT

A composite aluminium panel comprising two parallel plates and/or sheets secured to the peaks and troughs of a corrugated aluminium stiffener sheet between the parallel plates and/or sheets, wherein the corrugated aluminium stiffener sheet is made from an aluminium alloy rolled sheet of composition (in weight percent): Mg 1.5–6.0, Mn 0.3–1.4, Zn 0.4–5.0, Fe up to 0.5, Si up to 0.5, Zr up to 0.30; optionally one or more of Cr 0.05–0.3, Ti 0.01–0.20, V 0.05–0.25, Ag 0.05–0.40, and Cu up to 0.40; and other elements up to 0.05 each, 0.15 total, with a balance of Al; and having in an H-condition or in an O-condition a ratio of PS/UTS in the range of 0.4 to 0.9 and having good roll formability.

30 Claims, 4 Drawing Sheets

Step 1: Connect bendet plate or profile to bottom plate

Step 2: Connect corrugated sheet to bottom plate

Step 3: Connect top plate to bendet plate or profile and to corrugated sheet

COMPOSITE ALUMINIUM PANEL

FIELD OF THE INVENTION

This invention is concerned with a composite aluminium panel comprising two parallel plates and/or sheets secured to a stiffener sheet between the parallel plates and/or sheets, and with the use the composite aluminium panel in structural materials such as in the construction of large welded structures.

For the purpose of this invention sheet material is to be understood as a rolled product having a thickness of not more than 6.0 mm. DESCRIPTION OF THE RELATED ART Currently large welded structures such as the floor or cargo decks of a ship like a catamaran are built by welding together a large number of extruded sections of standard AA6000-series alloys such as the AA6082 alloy. A typical construction involves fusion welding of a large number of hollow and/or simple sections. Typically hollow sections of the AA6082 alloy are used since this alloy allows the designers to achieve significant weight reductions. This is mainly due to the fact that AA6082 alloy is the strongest of commercially available standard AA6000-series alloys. Because of the limitations imposed by extrudability of the AA6082 alloy, the minimum wall thickness for hollow sections is practically restricted to the range 2.5–4.0 mm depending on the design of the extruded section. This practical limitation on minimum wall thickness in turn limits the weight savings that can be achieved by improving the design.

Alternatively large engineering structures such as cargo or passenger decks of a ship can be constructed by joining pre-fabricated aluminium products produced by joining and/or welding of a number of roll formed corrugated sheets. The realisation of this approach relies on the availability of high strength corrugated aluminium alloy product shapes. This requires aluminium alloy sheets that are not only easy to roll form but also have higher strength. Standard available aluminium alloy feed stock for roll forming such as AA3004 alloy do not develop high enough strength to achieve significant weight reduction.

Within the scope of this invention roll forming, also known as contour roll forming or cold roll forming, is understood to be a continuous process for forming metal from sheet, strip, or coiled stock into desired shapes of essentially uniform thickness by feeding the stock through a series of roll stations equipped with contoured rolls, see Metals Handbook, 9th. edition, Vol.14, ASM International, 1988, pp.624–635.

Some disclosure of structures found in the prior art literature will be mentioned below.

U.S. Pat. No. 5,821,506 discloses a complex aerodynamically smooth exterior surface part made from an inductive superplastically formed part free of diffusion bonds, having at least four sheets, and having a primary dimension, comprising (a) an inner core having two faces defined by at lest two inductive superplastically formed core sheets made from superplastically alloys of titanium or aluminium, and (b) outer face sheets of superplastic alloys of titanium or aluminium brazed to the two faces of the core by a bronze alloy ribbon one face sheet on each face of the core.

U.S. Pat. No. 5,534,354 discloses a method of providing a superplastic form sandwich structure airfoil.

EP-A-0432308 discloses a multi-layer metal structures having heat insulation characteristics and is being made of alloys exhibiting superplasticity and which are capable of being subjected to superplastic forming. The structures are especially adapted for use in supersonic and hypersonic aircraft.

SUMMARY OF THE INVENTION

It is an object of the invention to provide a composite aluminium panel comprising corrugated aluminium stiffener sheet that combines a 20% higher strength than standard AA3004 alloy with good roll formability at these higher strengths and with good weldability. It is another object of the invention to provide a composite aluminium panel having a good corrosion resistance. It is a farther object of the invention the provide a composite aluminium panel which is easy and reliable to manufacture.

According to the invention in one aspect there is provided a composite aluminium panel comprising two parallel plates and/or sheets secured to the peaks and troughs of a corrugated aluminium stiffener sheet between the parallel plates and/or sheets, wherein the corrugated aluminium stiffener sheet is made from an aluminium alloy rolled sheet of composition (in weight percent):

| | |
|---|---|
| Mg | 1.5–6.0 |
| Mn | 0.3–1.4 |
| Zn | 0.4–5.0 |
| Fe | up to 0.5 |
| Si | up to 0.5 |
| Zr | up to 0.30 |
| optionally, one or more of | |
| Cr | 0.05–0.30 |
| Ti | 0.01–0.20 |
| V | 0.05–0.25 |
| Ag | 0.05–0.40 |
| Cu | up to 0.40 |
| others up to 0.05 each, 0.15 total | |
| Al | balance | and having in an H-condition or in the O-condition a ratio of PS/UTS in the range of 0.4 to 0.9 and having good roll formability.

PS and UTS stand for 0.2% proof strength and ultimate tensile strength respectively. The H-condition as indicated above is typically an Hxy-condition or modifications thereof, where x is in the range of 1 to 3 and y is in the range of 1 to 6, or modifications thereof.

By the invention a surprisingly good combination is achieved of 20% or more higher strength levels than standard AA3004 in soft and strain hardened tempers, a good formability at these higher strength levels and a good weldability. This combination in the corrugated stiffener sheet is achieved due to the compositional window and a suitable grain structure. In combination, they provide good bendability, a work hardening index "n" is the range of 0.10 to 0.40 at higher strengths levels of 20% improvement or more than AA3004 in comparable tempers and gauges, and good roll formability having bendability of one times thickness in the Hx6 tempers, with x in the range of 1 to 3, or in the soft temper. Using corrugated sheet with improved strength levels made out of the aluminium rolled sheet product set out above, allows for designing and constructing of composite panel structures which are lighter than the conventional structures, in particular those based on extruded aluminium alloys. Aluminium rolled sheet products of the defined composition have also been found with good corrosion resistance. This allows the composite panels to be applied in corrosive environments such as a marine environment when applied in a ship or offshore construction.

Roll formability of AA5000 series alloy sheet products may be assessed by means of their bendability performance. Bendability of a material may be tested in accordance with ASTM E-290. During this test a sheet material will be bend for 180° over a mandrel having the same thickness at the sheet material itself; indicated above as bendability of one times thickness. The convex surface of the bend is visually examined for the presence of cracks. The presence of one or more cracks larger than 1 mm indicated a "fail" bendability performance resulting in the sheet material to be rejecting for roll forming. The bendability performance is indicated as "good" in case there are no cracks larger than 1 mm can be seen on the convex surface of the bend.

In a preferred embodiment the corrugated aluminium stiffener sheet has a ratio of PS/UTS in the range of 0.4 to 0.8, and more preferably in the range of 0.4 to 0.7, to enhance roll formability.

In an embodiment the gauge of the corrugated aluminium stiffener sheet is in the range of up to 3.0 mm, and more preferably in the range of 0.2 to 1.0 mm gauge sheets.

The corrugated aluminium sheet may additionally be provided as patterned or embossed sheet.

The reasons for the limitations of the alloying elements in the corrugated aluminium stiffener sheet for application in the composite aluminium panel according to the present invention are described below. All composition percentages are by weight.

Mg is the primary strengthening element in the alloy. Mg levels below 1.5% do not provide the required strength and when the addition exceeds 6.0% severe cracking occurs during the casting and hot rolling of the product. The preferred level of Mg is between 3.0 to 5.6% as a compromise between fabricability and strength.

Mn is an essential alloying element. In combination with Mg the Mn provides the strength to the alloy product in both welded and non-welded condition. Mn levels below do not provide sufficient strength to the welded joints of the alloy product. Above 1.4% the hot rolling becomes extremely difficult. The preferred maximum limit for Mn is 0.9% which represents a compromise between strength and fabricability. More preferably the ratio Fe/Mn is in the range of 0.3 to1.0.

Zn in an important alloying element since it improves corrosion resistance in the alloy product when it is present in a range of up to 1.2%, preferably up to 0.9%. Further zinc serves as a strengthening element by age hardening in combination with Mg when the Zn is present in a range of 3.0 to 5.0%. In the latter case it is preferred to maintain a Zn/Mg-ratio in the range of 1.1 to 5, and preferably in the range of 4 to 5. When the Zn level is above 5.0% casting and subsequent hot rolling becomes more difficult, in particular at an industrial scale. Below 0.4% the effect of Zn is less significant, so as a consequence a minimum of 0.4% is required, and more preferably a minimum of 0.5%.

The Fe in the alloy product may form primary compounds of the Al—Fe—Mn type during casting and thereby limiting the beneficial effects due to the Mn as alloying element. Fe levels above 0.5% causes coarse primary particles formation and which decrease the formability of the alloy product. The preferred range of Fe is 0.15 to 0.30%, more preferably 0.20 to 0.30%.

The Si also combines with Fe to form coarse AlFeSi phase type particles and which can affect the formability of the alloy product. Further Si limits the beneficial effects of Mg. To avoid any unacceptable loss in formability the Si level must be kept below 0.5%. The preferred range for Si is 0.07 to 0.20%, and more preferably 0.10 to 0.20%.

The Zr is an important alloying element for achieving strength improvements. Further the Zr is important to improve the resistance against cracking during welding of the alloy products in accordance with this invention. Zr at a level above 0.3% results in coarse needle shaped primary particles that decrease fabricability of the alloy product and further decrease bendability of the obtained product. As a comprise between strength and formability a preferred range of 0.05 to 0.25% is required.

Ti is important as a grain refiner during solidification of both ingots and welded joints produced using the alloy product in accordance with the invention. However, Ti in combination with Zr can form undesirable coarse primary phases. In order to avoid this the Ti level in the presence of Zr should be kept below 0.2%, and preferably below 0.10%, the most preferred range for Ti is 0.01 to 0.10%.

Cr is an optional alloying element for further improving the corrosion resistance of the alloy product. However, Cr limits the solubility of both Mn and Zr. Therefore, to avoid the formation of coarse primary phases, the Cr level must be kept below 0.3%. A preferred range for Cr is up to 0.15%.

V is an optional alloying element, and may be used to substitute or in addition to Cr. The preferred range is from 0.05 to 0.25%. A more preferred maximum range for V is up to 0.15%.

Cu levels above 0.4% give rise to unacceptable deterioration in the pitting corrosion resistance of the alloy product. The preferred maximum level for Cu is up to 0.25%, and more preferably up to 0.1%.

Silver is an optional alloying element that can improve further the stress corrosion resistance of the alloy product. If added the presence should be limited to 0.4% and the minimum level in the alloy product is preferably at least 0.05%.

The balance is Al and inevitable impurities. Typically each impurity element is present at 0.05% maximum and the total of impurities is 0.15% maximum.

A very successful embodiment of the composite aluminium panel in accordance with the invention is where the corrugated aluminium stiffener sheet is further characterised by the following composition in weight percent:

Mg 5.0–6.0, preferably 5.0–5.6
Mn 0.6–1.2
Zn 0.4–1.5, preferably 0.4–0.9, more preferably 0.5–0.9
Zr 0.05–0.25
Cr up to 0.3
Ti up to 0.2
Fe up to 0.5, preferably 0.2–0.3
Si up to 0.5, preferably 0.1–0.2
Cu up to 0.4, preferably up to 0.1
Ag up to 0.4
balance Al and inevitable impurities.

With this embodiment it is achieved that a composite aluminium panel is provided of which the stiffener sheet combines a 20% or more higher strength than the standard AA3004 alloy in a comparable gauge and temper, with a good formability at these higher strength levels when assessed by means of bendability in accordance with ASTM E-290, with good weldability, and with a good corrosion resistance. The aluminium alloy product has very good formability in particular at gauges in the range up to 3.0 mm, and more preferably at gauges in the range of 0.2 to 1.0 mm. Further it has been found that this corrugated sheet material retains its shape after roll forming much better, viz. less springback, than conventional AA5xxx-series aluminium alloys, such as AA5083 and AA5456. Further this successful embodiment allows for high speed laser welding, typically in the range of 3 to 10 m/min and preferably in the range of 4 to 6 m/min, for the production of composite panels comprising at least one corrugated sheet made out of the aluminium sheet product as set out above. The good weldability, and in particular the good laser weldability, of the corrugated stiffener sheet as set out above, was unexpected over previous experience in the art with conventional high magnesium AlMg-alloys, such as AA5083 and AA5456.

In a more preferred embodiment the corrugated aluminium sheet in the O-temper has a minimum 0.2% proof strength (PS) of 110 MPa or more for gauges of up to 3 mm, and more preferably of 115 MPa or more, and most preferably of 120 MPa or more. For gauges of up to 3 mm the aluminium alloy product in the O-temper has a minimum ultimate tensile strength (UTS) of 270 MPa or more, preferably of 280 MPa or more, more preferably of 300 MPa or more, and most preferably of 310 MPa or more.

In a further embodiment of the composite aluminium panel in accordance with this invention the corrugated aluminium sheet may be provided with a cladding on at least one side of the surface of the rolled sheet of the following:
(i) it is of a higher purity aluminium alloy than said rolled sheet;
(ii) the cladding is of the Aluminium Association AA1000 series;
(iii) the cladding is of the Aluminium Association AA6000 series;
(iv) the cladding is of the Aluminium Association AA7000 series.

In this embodiment the cladding is brought onto the corrugated sheet prior to roll forming the sheet product into a corrugated profile. The corrugated aluminium sheet in accordance with the invention has a very good corrosion resistance. However, in certain extreme corrosive environments it may be useful to provide a cladding which further enhances to the corrosion resistance of the alloy product. Such clad products utilise a core of the aluminium alloy composition set out above and a cladding of higher purity which in particular corrosion protects the core. The cladding includes essentially unalloyed aluminium or aluminium alloys containing not more than 0.1 or 1% of all other elements. Aluminium alloys herein designated 1xxx-type series include all Aluminium Association (AA) alloys, including the sub-classes of the 1000-type, 1100-type, 1200-type and 1300-type. In addition it has been found that aluminium alloys of the AA6000-series, including the subclasses, and which contain typically more than 1% of alloying additions, can serve as cladding. And in addition it has been found that aluminium alloys of the AA7000-series, including the sub-classes, and which contain typically more than 0.8% of zinc as alloying element, can serve as cladding, such as AA7072. Other aluminium alloys could also be useful as cladding as long as they provide in particular sufficient overall corrosion protection to the core alloy product.

In a very advantageous embodiment of the composite aluminium panel of the invention, the corrugated aluminium stiffener sheet may be provided with a clad layer of an AA4000-series alloy, such as for example AA4047. In this embodiment the clad layer or layers are not primarily present to provide an improved corrosion resistance, although it may give a contribution, but it allows the corrugated aluminium sheet to be welded or brazed to another sheet, plate or extrusion product into prefabricated products. In the case of corrugated aluminium sheet clad with AA4000-series alloys, there is no need to provide filler wire during welding in cases where it is otherwise required. Further the structural integrity of the aluminium sheet is maintained, as a consequence higher Zn-levels can be present in the alloy product without affected the corrosion resistance of the heat-affected zone. The thickness of the clad layer should be sufficient to prevent loss of adhesion from the corrugated aluminium sheet and to protect the corrugated aluminium sheet from the heat affected zone. In case of brazing, it is possible to braze such clad corrugated sheet with another sheet or plate or extrusion into one piece at a temperature in the range where AA4000-series alloys can be melted. The brazing can be carried out with or without controlled atmosphere.

The clad layer or layers are usually much thinner than the core, each constitute 1 to 15 or 20 or possibly 25% of the total composite thickness. A cladding layer more typically constitutes around 5 to 12% of the total composite thickness.

The corrugated aluminium stiffener may be secured to a parallel plate or sheet by means of mechanical fastening elements or adhesion. In a preferred embodiment the corrugated aluminium stiffener is being secured to a parallel plate or sheet by weld lines extending along the peaks or troughs. This allows for a fast and economic and reliable production of composite panels. The weld lines can be obtained by using any one or combinations of the standard welding techniques, e.g. MIG, TIG, stir welding, friction stir welding, etc. In a further preferred embodiment the weld lines are obtained by laser welding techniques. Further at least one of the plates or sheets has on the other surface no visible weld lines, but a internal weld line structure where each line of which passes through a trough or peak and into the material of the plate or sheet without however totally penetrating that material. This gives a composite aluminium panel with weld lines on one face and smooth surface on the other face.

In an alternative embodiment the corrugated aluminium stiffener is being secured to a parallel plate or sheet by means of brazing. In this embodiment the corrugated aluminium stiffener is being made from the aluminium alloy product of the invention with a cladding from the AA4000-series alloys, as set out above.

In a preferred embodiment the corrugated aluminium stiffener between the panels has flat peaks and troughs.

Most typically, but not by way of limitation the composite aluminium panel is of a thickness such that the spacing between the external plates and/or sheets lies between 10 and 300 mm, more preferably between 10 and 200 mm. The surface plate/or sheet in such an instance is up to 25 mm thick in typical embodiment, and the corrugated aluminium stiffener is within the range of up to 6 mm thick, preferably up to 3 mm thick, and most preferably in the range of 0.2 to 1.0 mm thickness. By using the aluminium alloy product of the invention at these relatively thin gauges and applied in a composite aluminium panel as set out above, it is achieved that significant weight reduction can be obtained in constructions while maintaining at least the same strength and/or stiffness levels as previously known in the art.

It will be found usually preferable to have the two parallel plates and/or sheets portions each equal to or thicker than the metal thickness of the corrugated aluminium stiffener.

The parallel plates or sheets are preferably made out of aluminium alloy, and in case the corrugated aluminium stiffener is welded to a plate or sheet, the plate or sheet is preferably made of a weldable aluminium alloy. In a more preferred embodiment the plates and/or sheets are within the same compositional window as the corrugated aluminium stiffener obtained from an aluminium rolled product set out above.

In a further aspect of the invention there is provided in a welded panel construction comprising the composite aluminium panel of the invention and/or a corrugated sheet product of the invention. Such a welded panel construction further comprises of two aluminium profiles, typically U-, H- or T-shaped, made via extrusion or bending an plate or sheet product, where the composite aluminium panel is aligned between said two profiles. The panels are very simple and reliable to manufacture, and can be aligned in a practical manner in a workshop or a yard. Due to the closed structure of the panel, they are easy to transport and during transportation damage of the internal structure comprising the corrugated sheet or sheets is prevented.

The type of composite aluminium panel defined above can be used alone, for example for bulkheads, or like sub-divisions. However, two or more composite panels can themselves be linked together and form a parallel composite to define for example a hull compartment including sub-divisions or other large-scale metal constructions, such as truck or rail car floors, bridges and especially ships.

According to the invention in another aspect there is provided in the application of the composite aluminium panel as set out above in a welded structure, such as but not limited to the application in marine shipbuilding and marine offshore constructions. Further the composite aluminium panel may be applied in civil and railroad fields and the like, where lighter constructions are desired preferably having a good corrosion resistance.

Further the invention relates to the use of aluminium rolled material having a chemical composition as set out above and in the claims, as corrugated stiffener sheet and/or as parallel sheet or plate in the composite aluminium panel in accordance with the invention.

EXAMPLES

The invention will now be illustrated by several non-limitative embodiments and examples, with reference to the accompanying drawings, in which.

Figure 1A:
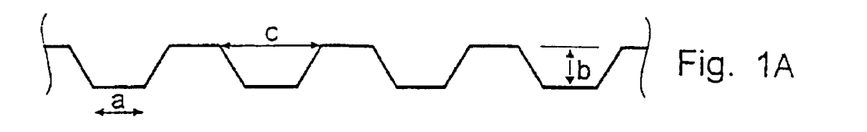
FIGS. 1A to 1C show cross-sections of several embodiments of corrugated sheet.
Figure 1B:
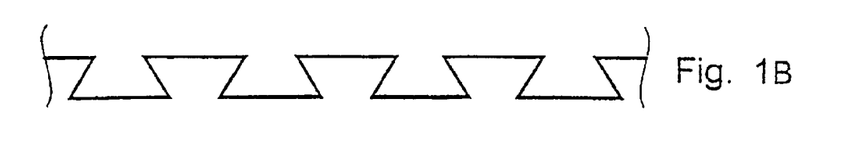
Figure 1C:
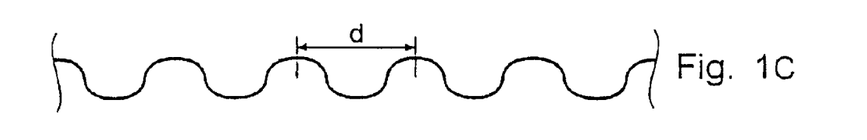

FIG. 1 shows schematically typical shapes of roll formed corrugated aluminium sheet, as seen in cross-section perpendicular to its direction of elongation. The corrugated aluminium sheet can be applied as a stiffener sheet in a composite aluminium panel in accordance with this invention. FIGS. 1A and 1B show flat peaks and troughs, and where FIG. 1B has a dovetail shape. An alternative embodiment is shown in FIG. 1C where the corrugated aluminium sheet has curved peaks and troughs. The indicated dimensions a, b, c, and d are typically in the range of 10 to 300 mm.

Figure 2A:
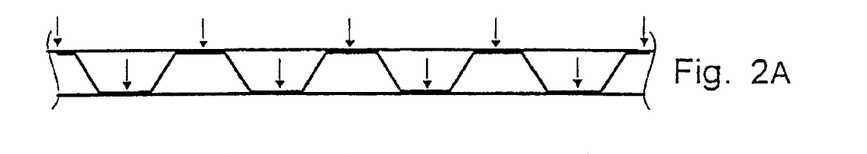
FIGS. 2A to 2C show cross-sections of several embodiments of composite aluminium panels.
Figure 2B:
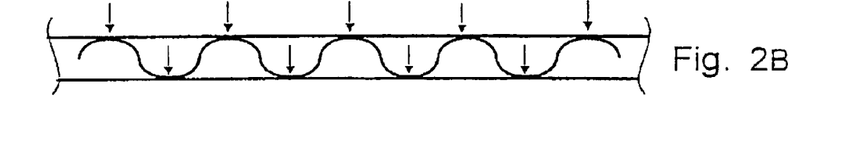
Figure 2C:
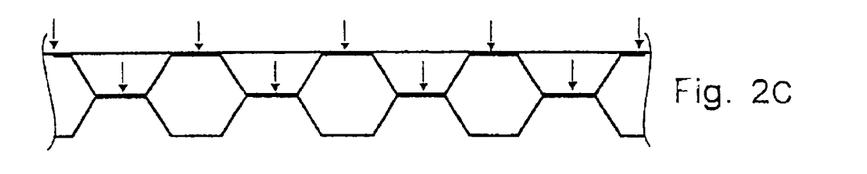

FIGS. 2A and 2B show schematically, as seen in cross-section perpendicular to its direction of elongation, composite aluminium panels of the invention where a corrugated aluminium stiffener is arranged between two parallel sheets and/or plates. The embodiment of FIG. 2C shows schematically, as seen in cross-section perpendicular to its direction of elongation, a composite aluminium panel where the corrugated aluminium stiffener comprises two corrugated sheets each with flat peaks and troughs and whereby the peak of one sheet is joined to the trough of the other corrugated sheet. The arrows in FIGS. 2A to 2C show the location of weld lines for securing the various sections to each other.

Figure 3A:
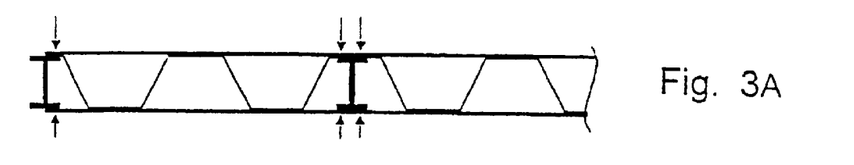
FIGS. 3A and 3B show in cross-sections a composite aluminium panel in connection with I-shaped beams.
Figure 3B:
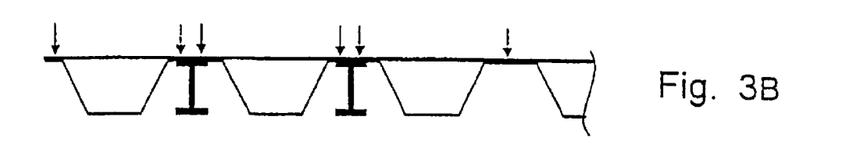

FIGS. 3A and 3B show schematically, as seen in cross-section perpendicular to its direction of elongation, a composite aluminium panel of the invention being secured to I-shaped beams or profiles by means of securing at least one of the parallel plates or sheet of the composite aluminium panel to the I-shaped beam.

Figure 4:
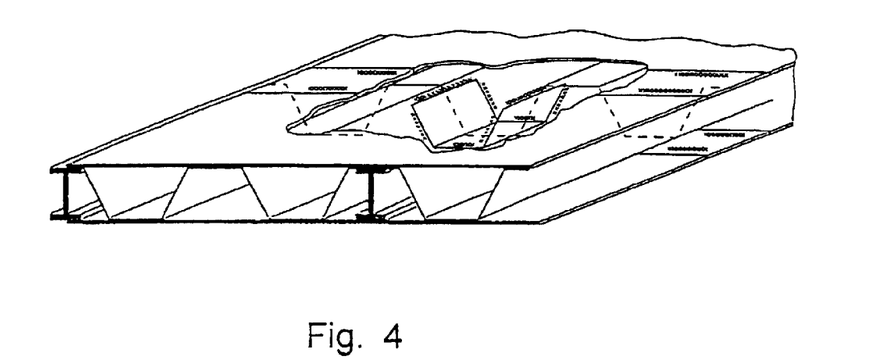
FIG. 4 shows a perspective view of a composite aluminium panel in connection with an I-shaped beam.

FIG. 4 show schematically a perspective view of composite aluminium panels are connected to each other in their direction of elongation. For this the following procedure can be used: firstly produce a section which fits with the contours of the corrugated shape, secondly open the top plating to expose the corrugated shape, thirdly place a "connecting corrugated section" on to the panels to be joined such that the "connecting corrugated section" is equally partitioned between the two sandwich panels, then join at those points marked as "xxxx" in the figure. The above procedure then securely fastens any two sandwich panels of current invention along the width direction. Alternatively sandwich panels can be produced in such away that one of the two top plates can be shorter than the other to allow ease of joining along the width direction.

Figure 5:
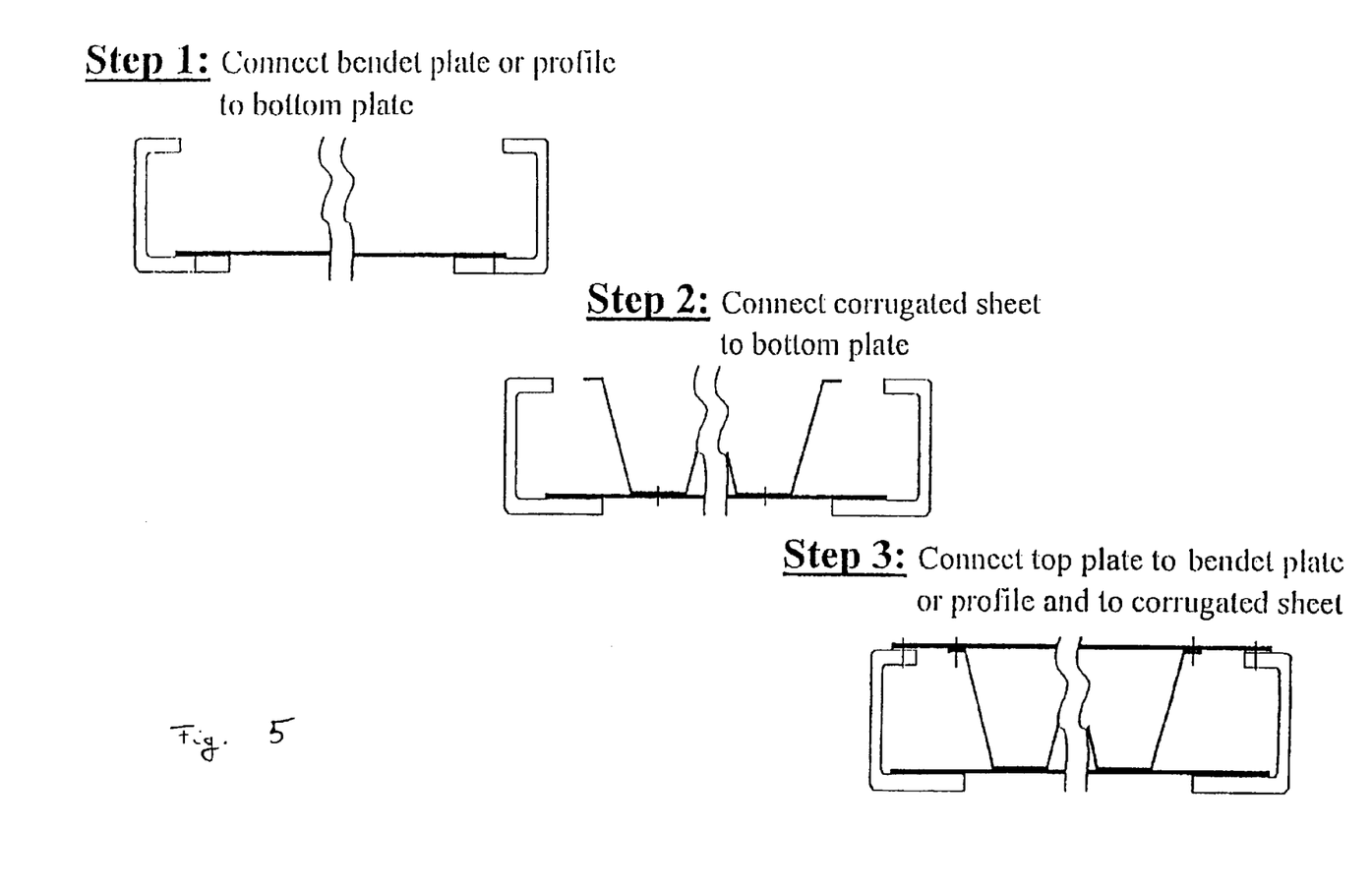
FIG. 5 shows schematically the steps of assembling a panel of the invention.
Figure 6:
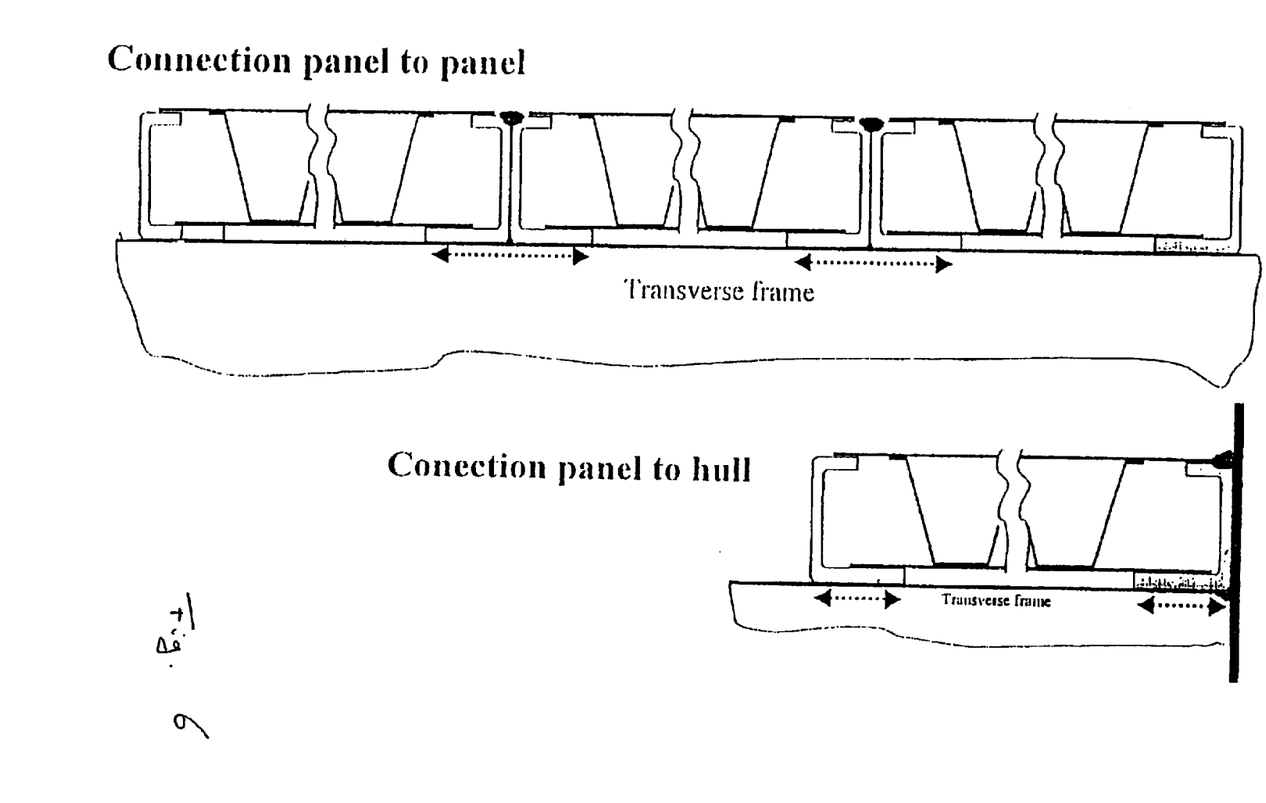
FIG. 6 shows cross-sections of the panels of the invention in connection to each other or to the wall or hull of a vessel.

FIG. 5 shows schematically how a panel in accordance of the invention can be assembled. A panel comprises of two aluminium U-, H- or T-shaped profiles, which profiles can either be made by extrusion or bending of a sheet or plate, said profiles being connected, preferably by means of welding at selected locations, by a first sheet of the aluminium product of the invention to one of the legs of each profile forming a bottom of the panel, see step 1 in FIG. 5. Subsequently, a pre-formed corrugated sheet or sheets are connected to said bottom of the panel, see step 2 in FIG. 5. And in a third step a top plate or sheet is connected, preferably by means of welding, to both the corrugated sheet and the other leg of each profile. The profiles have a typical thickness of 3 mm. In this way a very simple and effective way of manufacturing panels is being provide. The panels of the invention are simple to align in for example a workshop or a yard, and can be connected to form a transverse frame or can be connected via welding to the side walls of for example the hull of a ship in a very practical manner, as shown in FIG. 6. Further the panels are closed, are easy the handle and prevent damage of the enclosed corrugated sheets during transportation.

Example 1

An alloy within the compositional range of the invention, having the following chemical composition (in weight percent): 5.20% Mg, 0.84% Mn, 0.50% Zn, 0.13% Zr, 0.013% Cu, 0.049% Cr, 0.19% Fe, 0.11% Si, 0.015% Ti, balance aluminium and inevitable impurities, has been DC-cast on an industrial scale to an ingot having dimensions of 440×1480×4800 mm. The ingot has been preheated for 15 hours at 510° C., then hot rolled at about 500° C. to produce 4 mm gauge products. Prior to subsequent cold reduction, an intermediate anneal at 350° C. for a period of 2 hours has been applied. The annealed and hot rolled product was subsequently cold rolled to 2 mm gauge sheet. A second interanneal has been applied at 350° C. for a period of 2 hours. Followed by cold rolling to a final gauge of 1.0 mm and then final annealed with similar conditions as the interannealing in order to produce a soft temper product. The material has been assessed in accordance with EURO-norm 10,002 for its tensile properties in the LT-direction. Further the material has been assessed for its formability by testing the bendability in accordance with ASTM E-290. During this bendability test 1.0 mm gauge sheet material of 120×45 mm has been bent for 180° over a mandrel with the same thickness as the sheet material, viz. 1.0 mm. The bent specimens have been visually examined for the appearance of cracks on the convex surface of the bend. The outcome of this test is indicated by specifying good or fail. By the term "fail" it is indicated that there was at least one crack of 1 mm or more on the convex surface of the bend.

The results are listed in Table 1 where a comparison has been made with samples of standard AA3004 material in the O-temper. From these results it can be seen that the aluminium alloy product applied in accordance with this invention has a more than 20% higher strength level than AA3004 material in the same temper and with the same gauge, in this particular case an improvement of more than 45% has been achieved, while the bendability is at least equivalent to standard AA3004.

TABLE 1

| Material | Temper | Gauge [mm] | 0.2% PS [MPa] | UTS [MPa] | Elong. [%] | Bend-ability |
|---|---|---|---|---|---|---|
| Invention | 0 | 1.0 | 132 | 315 | 20.1 | good |
|  |  |  | 135 | 316 | 20.3 | good |
|  |  |  | 129 | 314 | 19.9 | good |
|  |  |  | 131 | 316 | 20.7 | good |
| AA3004 | 0 | 1.0 | 65 | 157 | 14.0 | good |
|  |  |  | 67 | 158 | 14.5 | good |
|  |  |  | 69 | 155 | 14.3 | good |
|  |  |  | 66 | 159 | 14.2 | good |

Example 2

Sheet material with dimensions of 1200×250 mm and of 1.0 mm thickness of standard AA3004 and material identical to the material of Example 1 and being within the preferred ranges set out in the claims, both materials were in the O-temper, were subjected a welding testing. Two identical sheets were welded together using a 12 kW $CO_2$ laser equipment, operating at 6 kW and with a line speed of 5 m/min. Tensile samples with weld beads were produced from such "through welded" sheets and tested for tensile properties.

The results are listed in Table 2. From these results it can be seen that after welding the aluminium product in accordance with the invention has at least 20% higher tensile properties than standard AA3004 material at similar gauges and temper. Further this example shows that the product of this invention may be welded at very thin gauges using laser techniques at relatively high welding line speeds. Further is has been found that when the base material is in the O-temper, the properties of the base material are essentially responsible for the mechanical properties after welding and not the welding technique applied. This can also be found from the results as listed in Table 1 and 2 where the material in accordance with the invention have mechanical properties in the same range. Further it has been found that the corrugated aluminium sheet applied in accordance with the invention is easy the laser weld, and in particular $CO_2$ laser welding, contrary to most conventional high Mg 5000-series alloys having a much lower zinc content. These conventional high AlMg alloy have more scatter of the laser beam by the welding-melt-pool. It allows the present corrugated aluminium sheet to be applied with wider ranges in laser welding as compared to standard high AlMg-alloys alloys such as AA5456.

TABLE 2

| Material | 0.2% PS [MPa] | UTS [MPa] | Elongation [%] |
|---|---|---|---|
| invention | 132 | 315 | 20.1 |
|  | 136 | 316 | 20.3 |
|  | 131 | 314 | 19.9 |
| AA3004 | 66 | 155 | 13.1 |
|  | 69 | 152 | 14.2 |
|  | 66 | 158 | 14.5 |

Example 3

Using the same processing route as with Example 1 sheet material which can be applied as corrugated aluminium sheet in accordance with the invention and having the same chemical composition has been produced with a final gauge of 1.3 mm. The two different final annealing treatment have been applied, after which the tensile properties have been determined in accordance with EURO-norm 10,002 in both the L- and LT-direction. The two final anneals applied were: (1) soak time of 1 hour at 250° C.; and (2) soak time of 1 hour at 350° C. In both cases the heating up rate was 25° C./hour and the cooling rate to below 100° C. after final annealing was 10° C./hour. Annealing of type (1) results in an H-temper and of type (2) results in an O-temper. The results are listed in Table 3. From these results it can be seen that the aluminium sheet applied in the composite aluminium panel in accordance with the invention can be provided in the O-temper and in an H-temper, in both cases having strength levels of at least 20% improvement over standard AA3004 material.

TABLE 3

| Annealing type | Gauge [mm] | L-direction | | | LT-direction | | |
|---|---|---|---|---|---|---|---|
| | | PS [MPa] | UTS [MPa] | Elong. [%] | PS [MPa] | UTS [MPa] | Elong. [%] |
| (1) | 1.3 | 252 | 370 | 9.6 | 254 | 370 | 12.3 |
|  |  | 254 | 372 | 11.0 | 255 | 371 | 12.5 |
| (2) | 1.3 | 128 | 317 | 14.7 | 126 | 311 | 20.2 |
|  |  | 128 | 318 | 15.9 | 127 | 314 | 19.9 |

What is claimed is:

1. A composite aluminium panel comprising two parallel plates and/or sheets secured to the peaks and troughs of a corrugated aluminium stiffener sheet by means of welding between the parallel plates and/or sheets, wherein the corrugated aluminium stiffener sheet is made from an aluminium alloy rolled sheet of composition (in weight percent):

| | |
|---|---|
| Mg | 1.5–6.0 |
| Mn | 0.3–1.4 |
| Zn | 0.4–1.2 |
| Fe | up to 0.5 |
| Si | up to 0.5 |
| Zr | up to 0.30 |
| optionally, at least one member of the group consisting of: | |
| Cr | 0.05–0.30 |
| Ti | 0.01–0.20 |
| V | 0.05–0.25 |
| Ag | 0.05–0.40 |
| Cu | up to 0.40 |
| other elements up to 0.05 each, 0.15 total | |
| Al | balance | and having in an H-condition or in an O-condition a ratio of PS/UTS in the range of 0.4 to 0.9 and having good roll formability, wherein the corrugated aluminium stiffener sheet has a thickness in the range of up to 3.0 mm.

2. A composite aluminium panel according to claim 1, wherein each parallel plate and/or sheet has a thickness in the range of up to 25 mm and the two parallel plates and/or sheets are spaced apart by a distance of 10 to 300 mm.

3. A composite aluminium panel in accordance with claim 1, further comprising a cladding on at least one side of the surface of the corrugated sheet and the cladding is a member of the group consisting of:
   (i) the cladding is of a higher purity aluminium alloy than said rolled sheet;
   (ii) the cladding is of the Aluminium Association AA1000 series;
   (iii) the cladding is of the Aluminium Association AA6000 series;
   (iv) the cladding is of the Aluminium Association AA4000 series; and
   (v) the cladding is of the Aluminium Association AA7000 series.

4. A composite aluminium panel in accordance with claim 1, wherein at least one of the two parallel plates and/or sheets are within the same compositional window as the corrugated aluminium stiffener.

5. A method of making the composite aluminium panel of claim 1 comprising:
   forming the aluminium rolled product into a corrugated aluminium stiffener sheet; and
   attaching a first parallel sheet or plate, to said corrugated aluminium stiffener sheet of an aluminium alloy which is of the same or different composition as the first parallel sheet and/or plate in a composite aluminium panel,
   attaching a second parallel sheet or plate to the corrugated aluminium stiffener sheet of an aluminium alloy which is of the same or different composition as the second parallel sheet and/or plate in the composite aluminium panel,
   wherein the stiffener sheet is attached to the first and second plates or sheets by welding to have the corrugated sheet between the first and second parallel sheets or plates, wherein the corrugated aluminium stiffener sheet has a thickness in the range of up to 3.0 mm.

6. A welded structure comprising at least one composite aluminium panel according to claim 1.

7. A composite aluminium panel according to claim 1 for ship building.

8. A composite aluminium panel according to claim 1 for marine offshore construction.

9. A composite aluminium panel according to claim 1, wherein the corrugated aluminium stiffener sheet has a thickness in the range of 0.2 to 1.0 mm.

10. A composite aluminium panel in accordance with claim 1, wherein the two parallel plates and/or sheets have been secured to the corrugated aluminium stiffener sheet by means of laser welding.

11. A composite panel according to claim 1 for application in a marine environment.

12. A composite aluminium panel in accordance with claim 1, wherein the two parallel plates and/or sheets have been secured to the corrugated aluminium stiffener sheet by means of friction stir welding.

13. A composite aluminium panel comprising two parallel sheets and/or sheets secured to the peaks and troughs of a corrugated aluminium stiffener sheet by means of welding between the parallel plates and/or sheets, wherein the corrugated aluminium stiffener sheet is made from an aluminium alloy rolled sheet of composition (in weight percent):

| | |
|---|---|
| Mg | 5.0–6.0 |
| Mn | 0.6–1.2 |
| Zn | 0.4–1.5 |
| Zr | 0.05–0.25 |
| Cr | up to 0.3 |
| Ti | up to 0.2 |
| Fe | up to 0.5 |
| Si | up to 0.5 |
| Cu | up to 0.4 |
| Ag | up to 0.4 | balance Aluminium and inevitable impurities, and having in an H-condition or in an O-condition a ratio of PS/UTS in the range of 0.4 to 0.9 and having good roll formability, wherein the corrugated aluminium stiffener sheet has a thickness in the range of up to 3.0 mm.

14. A method of making the composite aluminium panel of claim 13 comprising:
   forming the aluminium rolled product into a corrugated aluminium stiffener sheet; and
   attaching a first parallel sheet or plate, to said corrugated aluminium stiffener sheet of an aluminium alloy which is of the same or different composition as the parallel sheet and/or plate in a composite aluminium panel,
   attaching a second parallel sheet or plate to the corrugated aluminium stiffener sheet of an aluminium alloy which is of the same or different composition as the second parallel sheet and/or plate in the composite aluminium panel,
   wherein the stiffener sheet is attached to the first and second plates or sheets by welding to have the corrugated sheet between the first and second parallel sheets or plates, wherein the corrugated aluminium stiffener sheet has a thickness in the range of up to 3.0 mm.

15. A method according to claim 14, wherein Zn is 0.4–0.9%.

16. A composite aluminium panel according to claim 13, wherein Zn is 0.4–0.9%.

17. A welded structure comprising at least one composite aluminium panel according to claim 13.

18. A composite aluminium panel according to claim 13, wherein each parallel plate and/or sheet has a thickness in the range of up to 25 mm and the two parallel plates and/or sheets are spaced apart by a distance of 10 to 300 mm.

19. A composite aluminium panel in accordance with claim 13, further comprising a cladding on at least one side of the surface of the corrugated sheet and the cladding is a member of the group consisting of:

(i) the cladding is of a higher purity aluminium alloy than said rolled sheet;

(ii) the cladding is of the Aluminium Association AA1000 series;

(iii) the cladding is of the Aluminium Association AA6000 series;

(iv) the cladding is of the Aluminium Association AA4000 series; and (v) the cladding is of the Aluminium Association AA7000 series.

20. A composite aluminium panel in accordance with claim 13, wherein at least one of the two parallel plates and/or sheets are within the same compositional window as the corrugated aluminium stiffener.

21. A composite aluminium panel according to claim 13 for ship building.

22. A composite aluminium panel according to claim 13 for marine offshore construction.

23. A composite aluminium panel according to claim 13, wherein the corrugated aluminium stiffener sheet has a thickness in the range of 0.2 to 1.0 mm.

24. A composite aluminium panel in accordance with claim 13, wherein the two parallel plates and/or sheets have been secured to the corrugated aluminium stiffener sheet by means of laser welding.

25. A composite panel according to claim 13 for application in a marine environment.

26. A composite aluminium panel in accordance with claim 13, wherein the two parallel plates and/or sheets have been secured to the corrugated aluminium stiffener sheet by means of friction stir welding.

27. A composite aluminium panel comprising two parallel plates and/or sheets secured to the peaks and troughs of a corrugated aluminium stiffener sheet between the parallel plates and/or sheets, wherein the corrugated aluminium stiffener sheet is made from an aluminium alloy rolled sheet of composition (in weight percent):

| | |
|---|---|
| Mg | 1.5–6.0 |
| Mn | 0.3–1.4 |
| Zn | 0.4–5.0 |
| Fe | up to 0.5 |
| Si | up to 0.5 |
| Zr | up to 0.30 |
| optionally, at least one member of the group consisting of: | |
| Cr | 0.05–0.30 |
| Ti | 0.01–0.20 |
| V | 0.05–0.25 |
| Ag | 0.05–0.40 |
| Cu | up to 0.40 |
| other elements up to 0.05 each, 0.15 total | |
| Al | balance | and having in an H-condition or in an O-condition a ratio of PS/UTS in the range of 0.4 to 0.9 and having good roll formability, wherein the corrugated aluminium stiffener sheet has a thickness in the range of up to 3.0 mm.

28. A composite aluminium panel in accordance with claim 27 further comprising contacting the composite panel with a marine environment.

29. A composite aluminium panel comprising two parallel sheets and/or sheets secured to the peaks and troughs of a corrugated aluminium stiffener sheet between the parallel plates and/or sheets, wherein the corrugated aluminium stiffener sheet is made from an aluminium alloy rolled sheet of composition (in weight percent):

| | |
|---|---|
| Mg | 5.0–6.0 |
| Mn | 0.6–1.2 |
| Zn | 0.4–1.5 |
| Zr | 0.05–0.25 |
| Cr | up to 0.3 |
| Ti | up to 0.2 |
| Fe | up to 0.5 |
| Si | up to 0.5 |
| Cu | up to 0.4 |
| Ag | up to 0.4 | balance Aluminium and inevitable impurities, and having in an H-condition or in an O-condition a ratio of PS/UTS in the range of 0.4 to 0.9 and having good roll formability, wherein the corrugated aluminium stiffener sheet has a thickness in the range of up to 3.0 mm.

30. A composite aluminium panel in accordance with claim 29 further comprising contacting the panel with a marine environment.

* * * * *